United States Patent [19]

Krabbenhoft et al.

[11] Patent Number: 5,688,335
[45] Date of Patent: Nov. 18, 1997

[54] CONTAMINANT REMOVAL FROM MATERIAL

[75] Inventors: Herman Otto Krabbenhoft, Scotia; Jimmy Lynn Webb, Ballston Lake, both of N.Y.; James Hall Maxymillian, Pittsfield; Stephen Allen Warren, Becket, both of Mass.

[73] Assignees: General Electric Company; Maxymillan Technologies, Inc., both of Schenectady, N.Y.

[21] Appl. No.: 523,177

[22] Filed: Sep. 5, 1995

[51] Int. Cl.$^6$ .............................................. B08B 7/00
[52] U.S. Cl. ............................. 134/19; 134/21; 134/26; 134/28
[58] Field of Search ............................. 134/19, 26, 28, 134/29, 21; 405/128, 129, 130, 131

[56] References Cited

U.S. PATENT DOCUMENTS

| | | | |
|---|---|---|---|
| 4,424,081 | 1/1984 | Giguere | 134/10 |
| 4,574,013 | 3/1986 | Peterson | 134/2 |
| 4,864,942 | 9/1989 | Fochtman et al. | 110/226 |
| 4,985,083 | 1/1991 | Sogaard | 134/26 |
| 5,018,576 | 5/1991 | Udell et al. | 166/272 |
| 5,039,350 | 8/1991 | Rogers et al. | 134/27 |
| 5,064,526 | 11/1991 | Rogers et al. | 134/26 |
| 5,076,727 | 12/1991 | Johnson et al. | 405/128 |
| 5,094,012 | 3/1992 | Rosenstock et al. | 34/468 |
| 5,103,578 | 4/1992 | Rickard | 34/92 |
| 5,172,709 | 12/1992 | Eckhardt et al. | 134/95.1 |
| 5,188,041 | 2/1993 | Noland et al. | 110/246 |
| 5,190,405 | 3/1993 | Vinegar et al. | 405/128 |
| 5,200,033 | 4/1993 | Weitzman | 159/47.1 |
| 5,209,604 | 5/1993 | Chou | 405/128 |
| 5,256,208 | 10/1993 | Rafson | 134/19 |
| 5,318,116 | 6/1994 | Vinegar et al. | 405/128 |
| 5,489,738 | 2/1996 | Abramowitz et al. | 405/128 |

*Primary Examiner*—Robert J. Warden
*Assistant Examiner*—Alexander Markoff
*Attorney, Agent, or Firm*—James Magee, Jr.

[57] ABSTRACT

Contaminated material is treated with heat and steam to remove halogenated organic compounds from the material. The heating temperature can be lowered by admixing an additive with the contaminated material. A short passage of steam at a flow rate of about at least 0.5 pounds of water by weight per minute per ton of soil immediately following the heating and holding stage, substantially removes the halogenated organic contaminants to below ten parts per million in the treated material.

3 Claims, No Drawings

CONTAMINANT REMOVAL FROM MATERIAL

FIELD OF THE INVENTION

This invention is directed to decontaminating particulate materials contaminated with halogenated organic compounds. Particularly, the invention is directed toward decontaminating material contaminated with chlorinated organic compounds by applying heat followed by a sweep of steam.

BACKGROUND OF THE INVENTION

Compounds such as polychlorinated biphenyls (PCBs), dichloro-diphenyl trichloroethane (DDT), trichloroethylene (TCE), and chlorinated benzenes have been found to be persistent compounds in the environment. Due to spills and prior usage, these compounds are often found in soil, sludge and building materials. Their disposal requires a safe and efficient means.

Various methods for the removal or destruction of chlorinated organic compounds from soil are known. For example, U.S. Pat. No. 4,574,013 discloses a process wherein a heated slurry of contaminated soil is treated with a mixture of an alkaline constituent and a sulfoxide catalyst. This process is disadvantageous in that the sulfoxide catalyst may transport contaminants into living systems, and may produce odorous compounds when heated to high temperatures and decomposed into combustible by-products. Also, the process requires large amounts of reagents.

Other methods being used to remove chlorinated organic compounds from soil include incineration and surfactant-assisted washing. These methods are quite costly or require complex operations. For instance, surfactant-assisted soil-washing requires many unit operations in order to remove the polychlorinated biphenyls from the soil and to regenerate the surfactant wash solution. The cost of incinerating soil is mentioned as being in excess of two hundred dollars per ton.

A need exists for an efficient process that significantly removes halogenated organic compounds, particularly polychlorinated biphenyls, from contaminated materials, while leaving innocuous residue or no residue at all in the material. The process needs to utilize reagents that are relatively inexpensive, safe to handle, and work efficiently. Further, there is a need for a process that reduces polychlorinated biphenyls in the soil to two parts per million or less.

SUMMARY OF THE INVENTION

This invention satisfies these needs by providing a method for the removal of halogenated organic compounds from contaminated material where the contaminated material is heated below atmospheric pressure, where the pressure is measured about 0.1 to 3.0 inches of a water column below atmospheric pressure, at a process temperature greater than or equal to about 250° C. for a sufficient amount of time to completely heat the material, holding the material at the process temperature for a sufficient amount of time to vaporize substantially all of the halogenated organic compound, and then, while maintaining the material at the heated temperature, passing steam through the material at a flow rate of at least about 0.5 pounds of water converted to steam per minute per ton of material for a period of time to substantially remove all of the halogenated organic compounds from the material.

The combination of heat followed by a short sweep of steam derived from a flow of water at a rate of at least about 0.5 pounds of water by weight per minute per ton of contaminated material, can reduce the level of halogenated organic compounds, such as polychlorinated biphenyls (PCBs), to about two parts per million or less in the particulate material. The method is operated at a slightly negative pressure which is about 0.1 to 3.0 inches below atmospheric pressure as measured by a water column. The use of a water column to measure the pressure is known by those skilled in the art.

The contaminated material can be admixed with an additive, such as formic acid, oxalic acid, malonic acid, mono- or di- alkyl substituted malonic acid, salicylic acid, mono- or di- alkyl substituted salicylic acid, or sodium bicarbonate. Upon heating the admixture and then passing steam through it, the level of halogenated organic contaminants can be reduced to two parts per million or less, and either no by-products or only innocuous by-products from the additive remain in the particulate material. Additionally, by using small amounts of the additive with the contaminated material, the process temperature or process time, or both, may be lowered.

Accordingly, an advantage of the present invention is that it is a simple cost-effective ex situ process that reduces the halogenated organic compound level in the particulate material to less than or equal to two parts per million. Another advantage is that a minimum amount of steam can be employed so that any condensed water from the process would not need to be recycled. Still another advantage is the use of additives mixed with the contaminated material that facilitate the removal of the halogenated organic compounds at lower temperatures and shorter process times. Further, the additives decompose thermally to non-toxic by-products.

DESCRIPTION OF THE INVENTION

Remediation of contaminated material contaminated with halogenated organics has been achieved by a process which comprises heating the contaminated material below atmospheric pressure to at least about 250° C. for a period of time sufficient to heat throughout all of the material and substantially vaporize the halogenated contaminants, and then contacting the heated material in a physically separate step with steam at a flow rate of at least about 0.5 pounds of water per minute per ton of contaminated material for a period of time sufficient to substantially remove the halogenated organic compounds from the material. Prior to passing steam through the contaminated material, the heated material may be maintained at the heated temperature for a period of time up to about one hour. Also, the heating step and the steam step are physically separate. This means that after the contaminated material is heated, in a physically different step, steam is directed through the material to remove any residual contaminants. The steam step may be carried out in a separate container or chamber. The steam may be passed counter current to the direction of flow of the contaminated material. For example, if the contaminated material is flowing downward in a container, the steam is flowing upward through the contaminated material in order to carry away the vaporized halogenated contaminants.

Decontamination of the material can also comprise admixing an additive, typically two weight per cent, with the contaminated material, heating the resulting admixture to at least 250° C. for a period of time sufficient to heat all of the material throughout, holding the material at the heated temperature, and then passing steam at a flow rate of at least about 0.5 pounds of water per minute per ton of contaminated material to remove substantially any remaining halogenated organic compounds. The additives are benign and thermally decompose to form products such as carbon dioxide, carbon monoxide, acetic acid, and water.

The halogenated organic contaminant compounds can be aliphatic or aromatic and the halogen atom or atoms can be chlorine, bromine, iodine, fluorine, and mixtures thereof. Examples of aliphatic chlorinated organic compounds are trichloroethylene, perchloroethylene, tetrachloroethane, dichloroethylene, vinyl chloride, 1,1,1-trichloroethane, carbon tetrachloride, chloroform, and the like. Examples of aromatic chlorinated organic compounds are polychlorinated biphenyls, dioxins, chlorobenzene, pentachlorophenol, and the like. The process is especially suitable for the restoration of materials contaminated with polychlorinated biphenyls.

The contaminated materials are particulate and may be porous. The materials may comprise soil, sand, sludge, sediment, dirt, gravel, pulverized concrete, plastics, metals, and rubbers. The present method is particularly adapted for use with contaminated soils.

The phrase, "substantially remove the contaminant", means that the level of contaminant concentration has been reduced to less than about ten parts per million. It is preferred that residual contamination be reduced to about two parts per million or less. This invention can be applied to highly contaminated materials. For example, it is possible that an amount of a contaminant, such as polychlorinated biphenyl, may be present up to about 100,000 parts per million in the particulate material.

The amount of time needed to substantially remove, i.e. reduce the residual level of contaminant to less than ten parts per million, the contaminants is dependent on the process temperature, the time held at the process temperature, and the flow rate of the steam. Additionally, if an additive is admixed with the contaminated material, shorter time periods or lower heating temperatures may be utilized.

Typically, a heating period is chosen that allows the mass of porous and particulate material to be uniformly heated to a temperature near the volatilization point of the highest boiling contaminant, thus providing the contaminants in vapor form. The phrase "to vaporize substantially all of the halogenated organic compound" means that the level of contaminant that has not been vaporized is less than about ten parts per million. For ex situ applications where the material to be treated is removed or excavated from its natural setting, the heating of the particulate material is accomplished by an external heating means. Examples of external heating means include heating coils, heating rods, molten salt baths, thermal blankets, indirect flames, ovens, kilns, and furnaces.

Temperatures employed for heating material contaminated with halogenated organic compounds, generally are between about 250°–450° C. For contaminated material without additives, heating temperatures between about 370°–450° C. result in easier removal of the halogenated organic contaminants. Likewise, higher heating temperatures, between about 370°–450° C., result in shorter process times, such as thirty minutes or less. Lower heating temperatures of the material without additives, between about 250°–370° C., require longer time periods of heat treatment to remove the halogenated organic contaminants to residual levels less than or equal to about two parts per million. These time periods are often greater than thirty minutes.

It is contemplated that additives, such as formic acid, oxalic acid, malonic acid, mono- or di- alkyl substituted malonic acid, salicylic acid, mono- or di- alkyl substituted salicylic acid, or sodium bicarbonate, can be admixed with the contaminated material prior to heating for the purpose of lowering the heating temperature or shortening the process time, or both. Up to about 25 weight percent of the additive based on the weight of the contaminated material can be used. As little as 0.5 weight percent of the additive based on the weight of the contaminated material has been shown to be beneficial in removing organic contaminants from material. Two to five weight percent of the additive is a preferred amount. Greater amounts of the additive, such as up to about fifteen weight percent, can also be utilized. Large amounts of additive, greater than fifteen weight percent, may become costly without providing any benefit as to improving the rate of removing the contaminants or lowering the temperature of heating the material. Amounts greater than 25 weight percent have diminished value due to the cost. The amount of additive is determined by considering the desired process temperature of operation, the amount of contaminant present in the material, and the time of heating the material.

Application of steam to the contaminated material follows the heating and holding at the process temperature for a sufficient amount of time to vaporize substantially all of the organic compound in the contaminated material. The steam sweep is conducted while the material is maintained at the process temperature. The short sweep of steam in this method serves to further remove halogenated organic compounds and other organic compounds from the particulate material. The flow rate of the steam derived from water is at least about 0.5 pounds of water by weight per minute per ton of contaminated material. A preferred flow rate is about 5 to 250 pounds of water by weight per minute per ton of contaminated material. Higher flow rates may also be utilized. The passage of steam, also referred to as the steam sweep or sweeping with steam, is conducted for a short period of time, generally at least about 0.5 minutes, and preferably about 1.5 to 10 minutes, and most preferably about 2.0 to 5.0 minutes. The amount of time selected for passing steam through the material is based on the process temperature, the time period for heating, and the flow rate of the steam. For instance, a preferred time for passing steam at a flow rate of about 5.0 pounds of water by weight per minute per ton of material, through material heated at about 390° C. for about 20–25 minutes, is between about 2.5 to 5.0 minutes.

The practice of this invention is further demonstrated on soil contaminated with polychlorinated biphenyls. Contaminated soil with about 9000 parts per million polychlorinated biphenyls was heated at atmospheric pressure at about 390° C. for about fifteen to twenty-five minutes without passing steam through the soil. Heat without a sweep of steam yielded residual polychlorinated biphenyl levels of about 8.5 to 3.1 parts per million. Repeating the above process followed by a sweep of steam derived from a flow of water at a rate of about 5 pounds of water by weight per minute per ton of contaminated material for about 2.5 minutes yielded residual polychlorinated biphenyl levels of about 3.9 to 2.6 parts per million. When the steam sweep period was increased to about five minutes (flow of water at a rate of about 5 pounds of water by weight per minute; soil heated to about 390° C.), the residual polychlorinated biphenyls were about 3.1 to 1.0 parts per million. Table 1 gives the results for heat treatment of the soil and subsequent sweeping with steam.

TABLE 1

HEAT AND STEAM SWEEP PROCESS FOR CONTAMINATED PARTICULATE MATERIAL

| SAMPLE | TEMP. (°C.) | HEAT TIME (minutes) | STEAM TIME (minutes) | RESIDUAL PCB (ppm) |
|---|---|---|---|---|
| 1 | 387 | 15 | 0 | 8.5 |
| 2 | 385 | 20 | 0 | 6.6 |
| 3 | 390 | 25 | 0 | 3.1 |
| 4 | 390 | 30 | 0 | 2.4 |
| 5 | 394 | 15 | 2.5 | 3.9 |
| 6 | 394 | 20 | 2.5 | 2.9 |
| 7 | 393 | 25 | 2.5 | 2.6 |
| 8 | 392 | 15 | 5.0 | 3.1 |
| 9 | 397 | 20 | 5.0 | 1.9 |
| 10 | 395 | 25 | 5.0 | 1.0 |

Various additives allow the achievement of less than or equal to two parts per million of residual contaminant in the treated particulate material. To demonstrate, two weight percent of malonic acid or two weight percent of sodium bicarbonate were added in separate tests to soil contaminated with 9000 parts per million polychlorinated biphenyls. The soil was heated at about 355° C. for twenty-five minutes and the soil with malonic acid resulted in 2.3 parts per million residual polychlorinated biphenyl and the soil with sodium bicarbonate had 1.4 parts per million residual polychlorinated biphenyl. The above-mentioned tests were repeated with a five minute steam chaser at a flow rate of 5 pounds of water by weight per minute per ton of soil. The residual polychlorinated biphenyl levels were 1.1 parts per million for the soil with the malonic acid and 1.0 parts per million for the sodium bicarbonate. Other substances found beneficial as additives are oxalic acid, formic acid, and salicylic acid. Table 2 gives the results of tests done on polychlorinated biphenyl soil at about 355° C. for twenty-five minutes.

TABLE 2

RESIDUAL PCB LEVEL WITH ADDITIVES TO PARTICULATE MATERIAL

RESIDUAL PCB LEVEL FOR ADDITIVE (ppm)

| PROCESS CONDITIONS | no additive | oxalic acid 2% | malonic acid 2% | formic acid 2% | Sodium bicarbonate 2% |
|---|---|---|---|---|---|
| heat only | 19 | 4.7 | 2.3 | 2.3 | 1.4 |
| heat + steam* | 4.5 | 3.8 | 1.1 | 2.1 | 1.0 |

*The heating period consisted of 25 minutes; the steam sweep consisted of 5 minutes and employed water delivered to the preheater of the soil cell at the rate of 5 pound of water by weight per minute per ton of soil.

It is important to point out that the additives are benign. Malonic acid decomposes thermally to carbon dioxide and acetic acid. Formic acid decomposes thermally to carbon monoxide and water. Oxalic acid decomposes to carbon dioxide, carbon monoxide, and water. These decomposition products are readily volatilized off the soil during the thermal phase. The sodium bicarbonate is thermally decomposed to carbon dioxide and sodium hydroxide. Any sodium hydroxide residue left on the soil would be small enough to be inconsequential. Ultimately, carbon dioxide from the air converts the sodium hydroxide to innocuous sodium bicarbonate.

The invention process is further detailed in the following experimental description.

In a typical experiment, a stainless steel cell was filled with either polychlorinated biphenyl contaminated soil which had been previously air-dried to constant weight or a mixture of the air-dried polychlorinated biphenyl contaminated soil and two weight percent of a particular additive. The cell had a one inch diameter by three inch long tube equipped with Swagelok fittings at each end, one of which was connected to a long section of 1/16 inch diameter stainless steel tubing to function as a preheater to convert the water to steam and bring the temperature of the steam to that of the bath. The cell filled with contaminated soil, about thirty to forty grams of soil, had a 1/16 inch tubing exit line connected to a condenser, and was then immersed in a molten salt bath. The effluent from the cell passed through the condenser so that the liberated polychlorinated biphenyls and any other volatiles from the soil, such as any residual sorbed water, were condensed. Upon completion of the experiment, the cell was raised from the molten salt bath and cooled to room temperature. The soil was then removed from the cell and analyzed for residual polychlorinated biphenyl content. Tables 1 and 2 give results using the above procedure.

What is claimed:

1. An ex situ method to decontaminate particulate material contaminated with halogenated organic compounds comprising the steps of:

admixing the particulate material contaminated with halogenated organic compounds with an additive selected from the group consisting of formic acid, oxalic acid, malonic acid, mono- or di- alkyl substituted malonic acid, salicylic acid, mono- or di- alkyl substituted salicylic acid, and sodium bicarbonate, in an amount of about 0.5 to about 25 weight percent based on the weight of material;

heating an admixture of the particulate material contaminated with halogenated organic compounds and the additive to a process temperature of about 250° C. to about 450° C. at below atmospheric pressure for a period of time sufficient to heat all of the admixture to said process temperature;

holding the admixture at the process temperature for a period of time to substantially volatilize the halogenated organic compounds; and then sweeping steam derived from water through the admixture at a rate of at least about 0.5 pounds of water by weight per minute per ton of particulate material at said process temperature for a period of time sufficient to remove substantially all of the halogenated organic compounds from the admixture so that less than about ten parts per million of the halogenated organic compounds remain in the admixture.

2. A method according to claim 1 where the chlorinated organic compound is a polychlorinated biphenyl compound.

3. A method according to claim 2 where the pressure is about 0.1 to 3.0 inches of a water column below atmospheric pressure.

* * * * *